United States Patent [19]

Holzl

[11] 4,008,976
[45] Feb. 22, 1977

[54] CUTTING TOOL AND METHOD FOR MAKING SAME

[75] Inventor: Robert A. Holzl, La Canada, Calif.

[73] Assignee: Chemetal Corporation, Pacoima, Calif.

[22] Filed: Apr. 30, 1975

[21] Appl. No.: 570,551

Related U.S. Application Data

[63] Continuation-in-part of Ser. No. 470,538, May 16, 1974, abandoned.

[52] U.S. Cl. ............................... 408/144; 76/5 B; 76/101 A; 76/108 T; 29/95 R
[51] Int. Cl.² ................... B23B 27/18; B23B 51/02
[58] Field of Search ......... 408/199, 144; 76/108 R, 76/101 A, 108 T, 104 R, 5 B, DIG. 11; 117/107.2 R; 29/95

[56] References Cited

UNITED STATES PATENTS

| | | | |
|---|---|---|---|
| 1,485,444 | 3/1924 | Twogood | 76/108 T |
| 1,847,302 | 3/1932 | Emmons | 76/108 T |
| 2,858,718 | 11/1958 | Kohler | 76/108 T X |
| 2,887,407 | 5/1959 | Koch | 117/107.2 |
| 3,564,683 | 2/1971 | Schedler et al. | 29/95 |
| 3,565,676 | 2/1971 | Holzl | 117/107.2 R |
| 3,574,672 | 2/1971 | Tarver | 117/169 |
| 3,616,506 | 11/1971 | Ekemar | 29/95 |
| 3,658,577 | 4/1972 | Wakefield | 117/107.2 R X |

Primary Examiner—Willie G. Abercrombie
Attorney, Agent, or Firm—Fitch, Even, Tabin & Luedeka

[57] ABSTRACT

A cutting tool and method for making same are described in which a hard metal alloy coating is thermochemically deposited on the body of the tool to form a long wearing, high strength, layer. At least one cutting edge is machined in the layer.

21 Claims, 19 Drawing Figures

CUTTING TOOL AND METHOD FOR MAKING SAME

This application is a continuation-in-part of application Ser. No. 470,538 filed May 16, 1974, now abandoned.

This invention relates generally to cutting tools, including single point inserts, form tools, and penetrating tools such as drills and punches. More particularly, the invention relates to an improved cutting tool and to a method for making same wherein the resultant tool is of lower cost and has substantially longer life than prior art cutting tools.

Many techniques have been employed for lengthening the life of cutting tools. Such techniques include the manufacture of the tool out of a long life material such as the advanced high-speed steels, case hardening of the tool, or the manufacture of the tool out of an extremely hard material such as solid cemented tungsten carbide or the brazing of a tungsten carbide tip to the working end of a softer material. For many purposes neither high-speed steels nor case hardening provide sufficient hardness levels. Even cemented tungsten carbide wears faster than is desirable in some applications. Further, it is difficult to make a precise tool by the brazed insert method and the bond is frequently not as strong as desired. Some improvement in tool life has been achieved by providing a very thin coating of titanium carbide or other erosionresistant materials on a cemented tungsten carbide body. The relatively high cost of cemented tungsten carbide, however, makes this a relatively expensive solution to the tool-life problem.

It is an object of the present invention to provide an improved cutting tool and method for making same.

Another object of the invention is to provide a cutting tool having longer tool life than prior art cutting tools.

It is another object of the invention to provide a long life cutting tool which is low in cost and relatively easy to manufacture.

Other objects of the invention will become apparent to those skilled in the art from the following description, taken in connection with the accompanying drawings wherein.

Very generally, the cutting tool of the invention comprises a body 12 and a thermochemically deposited layer 13. The layer may cover one or more surfaces of the body and includes at least one cutting edge 14 machined therein. The layer is a hard metal alloy having a hardness of at least 1500 kg. per sq. mm. Vickers Hardness Number and extending from the body at least about 25 microns. The hard metal alloy is primarily of tungsten and carbon having a modulus of rupture in bending of greater than about 200 kg. per sq. mm., and the composite of the layer and the body has a modulus of rupture in bending of at least about 200 kg. per sq. mm.

Figure 1:
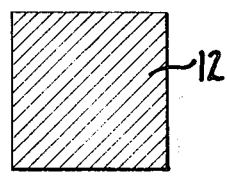
FIGS. 1 to 3 illustrate successive steps in the manufacture of an insert type cutting tool constructed in accordance with the invention.
Figure 2:
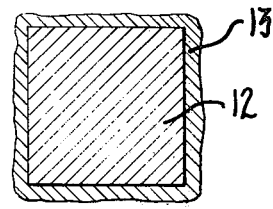
Figure 3:
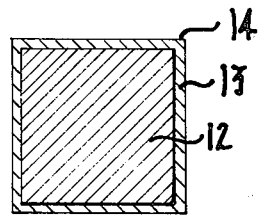

Referring now more particularly to FIGS. 1–3, the invention will be discussed in connection with a cutting tool of the so-called insert type. This type of cutting tool typically involves a tool of rectangular or triangular cross section which is mounted in a tool holder in a manner such that one of the elongated edges of the tool or one of the points of the tool engages the work piece. When the particular edge or point becomes dull, the orientation of the tool is shifted in the tool holder such that a new edge or point engages the work piece. Thus, in the case of a tool of rectangular cross section, a total of eight cutting edges or points are engageable with the work piece.

In FIG. 1, the tool body 12 is shown in full section in the uncoated condition. In accordance with the invention, a coating is placed upon the tool body 12, indicated at 13, to a thickness which is sufficient to machine a cutting edge therein. Subsequently, the required machining is carried out in the deposited coating to provide the desired cutting edges 14 in the tool.

The thickness of the coating 13 should be sufficient that, in combination with the substrate upon which it is deposited, i.e., the tool body, the forces encountered during the cutting operation are adequately resisted. Naturally, this thickness depends upon the materials utilized, however, such a thickness will typically exceed 25 microns and, in practice, is preferably in the range of 50 to 600 microns. The composite of the body and the layer should have a modulus of rupture in bending of at least about 200 kg. per sq. mm. Thus, on a high strength substrate, the strength of the layer may be near the mimimum specified. Where the substrate is of relatively low strength, the layer strength must be correspondingly higher.

It should be noted that in the embodiment of FIGS. 1–3, the deposit is placed completely surrounding the tool body 12. Although this is not critical to the invention, such a construction affords particular strength, since the outer portion of the tool comprises the region in which most of the cutting forces are absorbed. Since this region may be of higher tensile strength as compared with the body portion, an extremely high strength cutting tool may result using a minimum of high strength material and utilizing a relatively lower strength and less costly material for the tool body 12.

The coating may take place in a reaction chamber of the type normally used in known chemical vapor deposition techniques. The procedure by which such coatings, as described above, may be formed is described in greater detail in copending application Ser. No. 358,110 filed May 7, 1973 and assigned to the assignee of the present invention.

In the aforesaid copending application, for example, a deposit of a tungsten-carbon alloy may be formed by a particular deposition technique. First a volatile halide of tungsten in a gaseous form is reacted with hydrogen, oxygen and carbon in a gaseous form. Further reaction with hydrogen causes a deposit on the surface to be coated which is in a liquid phase. The liquid phase deposit then is converted on the surface to a solid phase deposit which is extremely strong, hard and wear-resistant. The deposition temperature is preferably held not greater than about 1100° C and the amount of hydrogen relative to the tungsten halide is preferably held below stoichiometric.

The limitation of the temperature and the hydrogen-metal halide ratio is to assure that the deposition involving the formation of the liquid phase and then conversion to the hard metal is effected in preference to the direct deposition of solid material from the gas phase by conventional chemical vapor deposition. The latter reaction produces a material of much inferior strength and wear properties.

As noted above, the resultant thermochemically deposited product consists of a hard metal alloy free of grain columns which extend through the deposit. In the case of the tungsten-carbon alloy, the Vickers Hardness exceeds 1,500 kg. per sq. mm. For most applications, the hardness should not be greater than about 2,500 kg. per sq. mm. lest the material be too brittle. Deposits at hardnesses as high as 3,000 kg. per sq. mm. have been made and are usable under certain circumstances. The deposited material, properly made, has high strength, having a modulus of rupture in bending of greater than 200 kg. per sq. mm. either as deposited or in the deposited and heat-treated condition. It is characteristic of such deposits that the surface of the coating is quite smooth and the grain size is generally equal to or less than 5 microns and frequently below 1 micron.

As noted, the useful hardness of the deposited layer depends on the application to which the tool is to be put. Hardnesses exceeding 3,000 kg. per sq. mm. Vickers Hardness Numbers usually present machining problems which significantly increase the cost of manufacture and may, under certain circumstances, result in cutting edges which are too brittle. Hardnesses below the aforementioned minimum hardness usually do not provide wear properties particularly greater than other types of tools such as high speed steels.

The particular type of hard metal alloy deposit which forms the deposited layer of the tool of the invention is, however, significantly more wear-resistant than cemented tungsten carbide of equal or even greater hardness. Although not fully understood, it is believed that the improved wear properties result from the lack of a binder or matrix material, as is present in cemented carbides. Although the metal carbide itself in cemented carbides is of high hardness, it is believed wear occurs as a result of the erosion of the matrix or cement materials holding the particles of the metal carbide together. Since no soft matrix is present in the deposited layer of the invention, wear performance, as set out below, is significantly greater than is the case with cemented tungsten carbide and other types of cutting tool construction.

The tool body or substrate material may be any suitable material. Although tool steels are usuallly satisfactory, some problems may be encountered during the deposition process due to the tendency for iron to enter into the reaction. Thus, less active materials such as tungsten, tungsten alloy, tungsten carbide, molybdenum or molybdenum alloy may be preferable. The latter materials also may be closer to the thermal expansion characteristics of the deposit to insure a better bond. Also such materials are relatively stiff and therefore usually provide better tool operation than less stiff materials. Alternatively, a relatively inert intermediate layer having proper thermal expansion characteristics may be used between the deposit and substrate.

Prior art cutting tools employing deposited materials typically rely on the cohesive forces between the deposit and the substrate, together with the substrate strength itself, to resist cutting loads. As a result, the prior art teaching has been to the effect that only thin coatings over existing cutting edges were useful in improving tool life, and that high strength substrates were necessary. Although some attempts were made at manufacturing composite tools by sintering techniques, different rates of shrinkage made such manufacture extremely difficult and expensive.

Unlike the prior art, applicant's invention is not a coated cutting tool, but a composite tool in which a specific type of deposit is used to form a relatively massive cutting edge material. The cutting edge is machined after the deposit is made and is machined in the deposit. The cutting edge geometry is not primarily determined by the shape of the substrate. Moreover, a substantial part of the cutting load is absorbed by the deposit itself.

Figure 4:
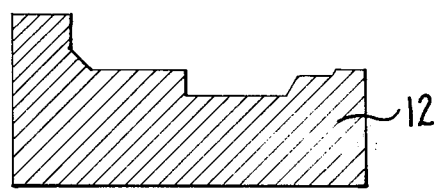
FIGS. 4 to 6 illustrate successive steps in the manufacture of a form type cutting tool constructed in accordance with the invention.
Figure 5:
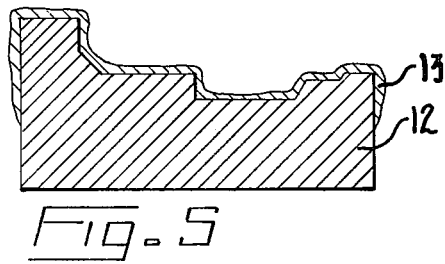
Figure 6:
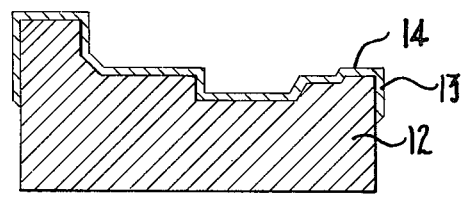

Referring now to FIGS. 4 through 6, a form tool is illustrated as constructed in accordance with the invention. The rough form is suitably machined in the upper surface of the tool body 12 as illustrated in FIG. 4. Next, a deposit 13 as discussed above is placed upon the upper surface of the tool body 12. The other surfaces are masked, although due to masking difficulties some of the deposit extends downwardly along the side of the body portion a short distance. The deposit 13 is made as discussed above and is subsequently machined as in FIG. 6 to provide the cutting edge 14 in the form desired.

Figure 7:
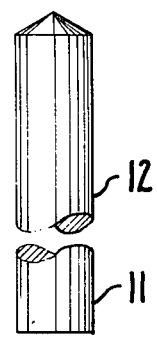
FIGS. 7 and 8 are elevational views, partially in section, of two types of drill blanks prior to modification in accordance with the invention.

Referring now to FIG. 7, a drill blank is shown in which the particular embodiment illustrated in FIGS. 7, 9, 12 and 13 comprises a shank portion, a body and a tip or point. The tip or point is machined on the end of the body to a conical shape which is relieved from its apex to a suitable angle, frequently 130° included.

In accordance with the method of the invention, the drill blank is provided with a thermochemically deposited hard metal alloy which serves as an axial extension of the body. The deposit is caused to be made on the end of the body by masking all other surfaces. Because of the difficulty in perfect masking, some of the deposit frequently extends downward along the sides of the body a short distance. The deposit is made using the thermochemical technique discussed above to provide an extremely fine-grain, hard structure having excellent wear resistance.

Figure 8:
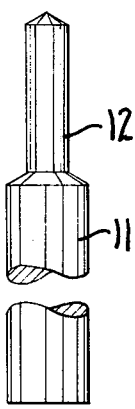
Figure 11:
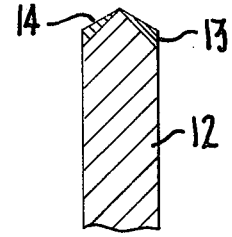
FIG. 11 is a cross-sectional view illustrating the as-deposited blank of FIG. 10 after cylindrical grinding for a straight shank drill.
Figure 12:
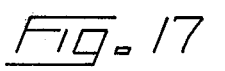
FIG. 12 illustrates the cylindrical grinding for a drill wherein the body is smaller than the shank.

Next, the body and deposited tip layer of the drill are cylindrically ground, as shown in FIGS. 11 and 12, providing the original blank was of consistent diameter as shown in FIG. 7. If a blank of the nature of FIG. 8 was used, the smaller diameter of the body and tip are cylindrically ground. These manufacturing procedures provide for producing drills of a configuration wherein the body and shank are of the same diameter, or drills wherein the body is of a smaller diameter than the shank.

Figure 13:
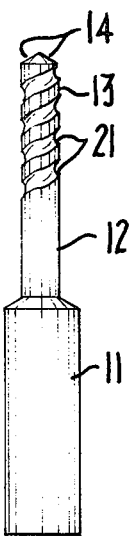
FIG. 13 shows an elevation of the drill of FIG. 12 after fluting on the body and tip.
Figure 14:
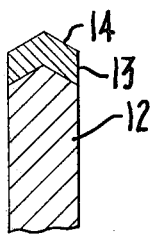
FIG. 14 is a cross-sectional view of the tip end of a drill as originally pointed.
Figure 9:
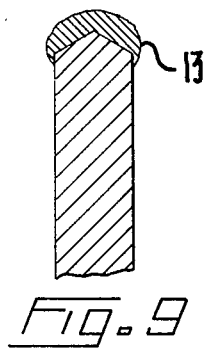
FIG. 9 is a cross-sectional view showing the nature of the deposit which provides axial extension of the tip using a blank as shown in FIG. 7.
Figure 10:
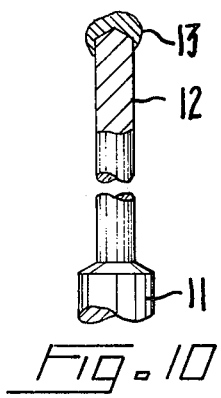
FIG. 10 is a cross-sectional view showing the nature of the deposit which provides axial extension of the tip using a blank as shown in FIG. 8.
Figure 15:
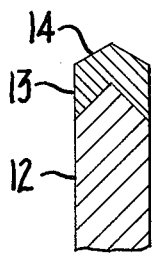
FIG. 15 is a cross-sectional view of the tip end of a drill as pointed with a different false point angle.

If the drill is to be a twist drill, the body and tip are ground with a pair of helical flutes 21, as shown in FIG. 13. If the embodiment of the invention is that of a spade drill, all manufacturing procedures are the same except that flat parallel surfaces are ground in the body in lieu of the helical flutes. The thickness of the deposited tip is always made sufficient to allow the tip thence to be machined to provide a cutting edge therein, as shown in FIGS. 14 and 15. This is preferably at least about 200 microns.

Figure 16:
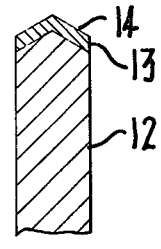
FIG. 16 is a cross-sectional view showing a resharpening of the drill shown in FIG. 14 after certain wear.

FIGS. 14 and 15 represent the deposits on either a blank which has been false pointed at the same angle as the intended finished angle of the point, or at a more acute angle than the intended finished angle of the point. The only difference between the two different angles of false pointing relates to the resharpening ability and the area of bonding surface between the body and the tip. Generally, a relatively stronger bond is effected using a more acute angle for the false point. The ability to provide additional resharpening after the drill has been somewhat worn in use is illustrated in FIGS. 16 and 17.

Figure 17:
FIG. 17 is a cross-sectional view showing the resharpening of the drill shown in FIG. 15 after certain wear.

It may be noted by reference to FIG. 17 that for a given amount of deposit more resharpenings are possible if a more acute angle is used for the false point. It may be seen that ultimately resharpening of the configuration as illustrated in FIG. 17 will cause a portion of the body to emerge through the central part of the tip of the tool. This does not necessarily disqualify the tool from further use since most of the cutting occurs near the outer periphery of the cutting edge, where the wear-resistance material is most useful.

Figure 18:
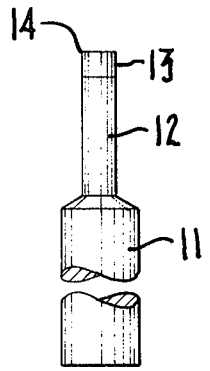
FIG. 18 is an elevational view of a punch constructed in accordance with the invention.

FIG. 18 shows a punch which is a further embodiment of the invention manufactured by procedures which are obviously similar except that no false point is put on the blank, no flutes are ground, and the cutting edge is ground into a flat tip. Resharpening of the punch is possible providing sufficient deposit is made.

Figure 19:
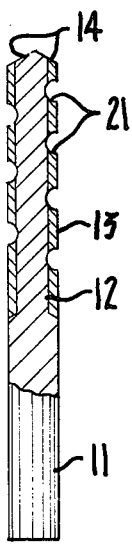
FIG. 19 is a partial section view of a sleeve drill constructed in accordance with the invention.

FIG. 19 illustrates a sleeve drill which is made by coating the body around the diameter as well as the end. Subsequent machining leaves the construction illustrated in which a sleeve of the deposited material surrounds the tool body and in which the point and flutes are machined in both the coating and the tool body. This provides the more wear and erosion resistant material, i.e. the deposit, in the region of maximum wear, even after multiple resharpenings. Since the coating materials described herein have typically a high modulus, the construction of FIG. 19 provides the additional advantage of stiffening the drill.

The following examples are set out to illustrate specific applications of the invention. They are not intended to limit the scope of the invention in any way.

EXAMPLE 1

Tungsten carbide and molybdenum rods 3 mm. diameter and having hemispherical ends were coated with a half mm. thick thermochemical deposit of tungsten-carbon alloy on their ends. The rods were then ground flat across the diameter for a short distance back from the tips, and the ends were also ground to leave a 0.25 mm. thick axial extension of deposit and to form a cutting edge in the deposit. Tool life was about 10 times that of identically shaped high speed steel tools for both the tungsten carbide and molybdenum substrates when machining high strength 4340 steel, mild carbon steel, and Ti6A14V alloy.

EXAMPLE 2

A 37.5 mm. long 3 mm. diameter right cylindrical rod of C-2 cemented carbide was ground to a conical surface on the tip. All surfaces except the tip were masked and a deposit made of approximately 0.75 mm. of tungsten-carbon alloy. The deposit was made at approximately 900° C using tungsten hexafluoride, hydrogen and methanol vapor. Test specimens of the same deposited material had shown a modulus of rupture in bending of 420 kg. per sq. mm. and a Vickers Hardness Number of 1,750 kg. per sq. mm.

A drill was then machined from the blank maintaining the shank at 3 mm. diameter grinding the body including the tip with a diamond abrasive wheel to 0.9 mm. for 12.5 mm. in length from the tip. The body and the tip were then ground with helical flutes in accordance with the usual commercial drill manufacturing procedures. Thence, the tip end was pointed in accordance with usual procedure.

The performance of this drill was compared with the performance of commercially supplied cemented carbide drills in drilling holes in copper clad, glass-fiber-filled, plastic board designated by industry as standard G-11 printed circuit board. Whereas the commercial drills were worn sufficiently to be unusable in less than 10,000 holes, the drills made by the method of the invention showed little or no wear and were still quite usable at 30,000 holes.

EXAMPLE 3

A blank similar to that of Example 2, 37.5 mm. long 3 mm. diameter of molybdenum metal with a 130° conical tip was coated with 0.75 mm. of tungsten-carbon alloy having a hardness of 1,500 kg. per sq. mm. Vickers Hardness Number. Deposit conditions and reactants were similar to Example 1. The blank was manufactured into a configuration of a spade drill and compared in performance with a similar drill of C-2 carbide in drilling holes in commercial graphite. Whereas the cemented carbide tool was worn in less than 100 holes, the useful life of the molybdenum tool with the thermochemically deposited tungsten-carbon alloy point exceeded 1,000 holes.

EXAMPLE 4

A 37.5 mm. long tungsten metal blank 3 mm. diameter was processed by depositing a 0.5 mm. layer of tungsten-carbon alloy on one flat end, all other surfaces being masked. Following this, 12.5 mm. of the length from the tip end was ground to a 0.75 mm. diameter and then the remaining tip end was ground flat and perpendicular to the axis of the piece. The resultant part was suitable as a punch for penetrating holes in printed circuit board as well as copper, steel and tantalum sheet.

It may therefore be seen that the invention provides an improved cutting tool and a method for making same. The cutting tool of the invention has extremely long life, is capable of being manufactured easily and at a relatively low cost, and is readily resharpened.

Various modifications of the invention in addition to those shown and described herein will become apparent to those skilled in the art from the foregoing description and accompanying drawings. Such modifications are intended to fall within the scope of the appended claims.

What is claimed is:

1. A cutting tool comprising, a tool body and a thermochemically deposited hard metal alloy layer extending from at least one surface of said tool body, said layer having a thickness of at least about 25 microns and having at least one cutting edge machined within the boundaries of said layer, said thermochemically deposited hard metal alloy being comprised primarily of tungsten and carbon and having a Vickers hardnes of at least about 1,500 kg. per sq. mm. and a modulus of rupture in bending of greater than about 200 kg. per sq. mm. in the deposited or deposited and heat-treated condition, and wherein the thickness and strength of said layer are sufficient that the modulus of rupture in bending of the composite of said body and said layer is at least about 200 kg. per sq. mm.

2. A cutting tool according to claim 1 wherein the thickness of said layer is sufficient to enable said layer itself to withstand a substantial amount of the forces applied thereto as a result of cutting loads.

3. A cutting tool according to claim 1 wherein an intermediate layer of material is provided between said tool body and said hard metal alloy layer, said intermediate layer comprising a material having thermal expansion compatibility with both the material of said tool body and with said hard metal alloy.

4. A cutting tool according to claim 1 wherein said body of said tool is made of cemented tungsten carbide.

5. A cutting tool according to claim 1 wherein said body of said tool is made of tungsten or tungsten alloy.

6. A cutting tool according to claim 1 wherein said body of said tool is made of molybdenum or molybdenum alloy.

7. A method for making a cutting tool comprising, thermochemically depositing on at least one surface of a body a hard metal alloy to form a layer having a thickness of at least 25 microns, said hard metal alloy being comprised primarily of tungsten and carbon and having a Vickers hardness of at least about 1,500 kg. per sq. mm., and a modulus of rupture in bending of greater than about 200 kg. per sq. mm. in the deposited or deposited and heat-treated condition, and machining at least one cutting edge in said layer, said layer having a thickness and strength after machining sufficient that the modulus of rupture in bending of the composite of said body and said layer is at least about 200 kg. per sq. mm.

8. A penetrating tool comprising a shank, a body and a thermochemically deposited hard metal alloy layer extending from at least one surface of said body and having a thickness of at least about 25 microns, said layer having at least one cutting edge machined within the boundaries of said layer, said thermochemically deposited hard metal alloy being comprised primarily of tungsten and carbon and having a Vickers hardness of at least about 1,500 kg. per sq. mm. and a modulus of rupture in bending of greater than 200 kg, per sq. mm. in the deposited or deposited and heat-treated condition, wherein the thickness and strength of said layer are sufficient that the modulus of rupture in bending of the composite of said body and said layer is at least about 200 kg. per sq. mm.

9. A penetrating tool according to claim 8 wherein said layer extends axially from said body at least about 200 microns.

10. A penetrating tool in accordance with claim 8 wherein said deposit forms a sleeve around at least a portion of said body, said sleeve having a thickness of at least about 200 microns or 25% of the finished outer diameter of the tool, whichever is less.

11. A penetrating tool according to claim 8 wherein said tool comprises a drill, wherein the end of said body is pointed, and wherein said layer extends axially from the end of said body.

12. A penetrating tool in accordance with claim 11 wherein two machined helical flutes extend axialy in both said body and said layer.

13. A penetrating tool according to claim 11 wherein two machined flat parallel surfaces extend axially in both said body and said layer.

14. A penetrating tool according to claim 8 wherein said tool comprises a punch having a flat tip, and wherein said layer extends axially from an end of said body.

15. A penetrating tool in accordance with claim 8 wherein said body of the tool is made of cemented tungsten carbide.

16. A penetrating tool in accordance with claim 8 wherein said body of the tool is made of tungsten or tungsten alloy.

17. A penetrating tool in accordance with claim 8 wherein said body of the tool is made of molybdenum alloy.

18. A method for making a penetrating tool comprising, thermochemically depositing on the end of a body a hard metal alloy to form a tip having an axial dimension sufficient to allow a cutting edge to be machined therein, said hard metal alloy being comprised primarily of tungsten and carbon and having a Vickers hardness of at least about 1,500 kg. per sq. mm. and a modulus of rupture in bending of greater than about 200 kg. per sq. mm. in the deposited or deposited and heat-treated condition, and machining at least one cutting edge in said tip.

19. A method according to claim 18 wherein said tool comprises a twist drill, wherein said body is machined with helical grooves therein, and wherein said tip is machined to a point on the axis of said body.

20. A method according to claim 18 wherein said tool comprises a punch, and wherein said tip is machined to have a flat perpendicular to the tool axis and having an annular cutting edge.

21. A method according to claim 18 wherein said tool comprises a spade drill wherein substantially flat parallel surfaces are machined in said body, and wherein said tip is machined to a point on the axis of said body.

* * * * *